United States Patent

Hoffman et al.

[11] Patent Number: 6,130,976
[45] Date of Patent: Oct. 10, 2000

[54] COUPLING SYSTEM FOR A LIGHT CONDUIT

[75] Inventors: Joseph A. Hoffman, Minneapolis; Duwayne C. Radke; Kenneth J. Hagen, both of Woodbury, all of Minn.

[73] Assignee: 3M Innovative Properties Company, St. Paul, Minn.

[21] Appl. No.: 09/060,727

[22] Filed: Apr. 15, 1998

[51] Int. Cl.[7] .............................. G02B 6/26; G02B 6/40; G02B 6/38; G02B 6/00
[52] U.S. Cl. .............................. 385/56; 385/31; 385/54; 385/55; 385/75; 385/136
[58] Field of Search ............................ 385/54, 55, 56, 385/75, 136, 31

[56] References Cited

U.S. PATENT DOCUMENTS

| | | |
|---|---|---|
| 4,260,220 | 4/1981 | Whitehead . |
| 4,615,579 | 10/1986 | Whitehead . |
| 4,750,798 | 6/1988 | Whitehead . |
| 4,787,708 | 11/1988 | Whitehead . |
| 4,805,984 | 2/1989 | Cobb, Jr. . |
| 4,834,495 | 5/1989 | Whitehead et al. . |
| 4,906,070 | 3/1990 | Cobb, Jr. . |
| 5,056,892 | 10/1991 | Cobb, Jr. ............................ 359/831 |
| 5,309,544 | 5/1994 | Saxe . |
| 5,339,382 | 8/1994 | Whitehead . |
| 5,363,470 | 11/1994 | Wortman . |
| 5,475,785 | 12/1995 | Johanson ............................ 385/100 |
| 5,481,637 | 1/1996 | Whitehead . |
| 5,483,119 | 1/1996 | Johanson . |
| 5,661,828 | 8/1997 | Riser et al. ............................ 385/31 |
| 5,661,839 | 8/1997 | Whitehead . |
| 5,715,347 | 2/1998 | Whitehead . |
| 5,784,517 | 7/1998 | Johanson . |

FOREIGN PATENT DOCUMENTS

| | | |
|---|---|---|
| 0 235 447 A2 | 11/1986 | European Pat. Off. . |
| 196 40 324 A1 | 3/1998 | Germany . |
| 196 40 325 A1 | 3/1998 | Germany . |

*Primary Examiner*—Frank G. Font
*Assistant Examiner*—Armando Rodriguez
*Attorney, Agent, or Firm*—David B. Patchett

[57] ABSTRACT

A coupling system for light conduits in a light distribution system and a light distribution system utilizing the coupling system. The coupling system includes first and second collars. The first collar has a first opening, a first side adapted to couple to an end of the first light conduit, and a second side adapted to operatively engage with a second collar. The second collar has a second opening, a first side adapted to couple to an end of the second light conduit, and a second side adapted to operatively engage with the second side of the first collar. Registration members maintain rotationally and axially alignment of the first and second openings of the first and second collars at a conduit interface. A retaining mechanism maintains axial engagement of the first collar with the second collar.

27 Claims, 4 Drawing Sheets

COUPLING SYSTEM FOR A LIGHT CONDUIT

FIELD OF THE INVENTION

The present invention relates to a coupling system for a light conduit that provides both structural and environmental integrity to a light distribution system, and to a light distribution system utilizing the coupling system.

BACKGROUND OF THE INVENTION

The illumination of a large area by a central lighting system has long been desired because of its many advantages. For example, a centralized light source is easier to maintain and can be more cost effective than distributed light sources. Heat generated by a centralized light source can be vented from the lighted area, whereas heat from distributed light sources is not easily vented. A light distribution system radiates minimal or no heat at locations remote from the centralized light source. The centralized light source can be sunlight and/or artificial light.

Light pipes or light conduits made of a transparent material having substantially planar inner surfaces and outer surfaces that are "in octature" have been utilized to transport light, as illustrated in U.S. Pat. No. 4,260,220 to Whitehead. These devices are typically constructed of an optical lighting film made of flexible polymeric sheets of a transparent material having a structured surface on one side and a smooth surface opposite the structured surface. The structured surface of the devices preferably include a linear array of miniature substantially right angles isosceles prisms arranged side-by-side to form a plurality of peaks and grooves. Further, the perpendicular sides of the prisms make an angle of approximately 45 degrees with the smooth surface. This structure of the polymeric sheets, as well as the shape of the light conduit, enables light to be constrained to travel through the light conduit without escaping through its walls if the angle by which the light rays deviate from the longitudinal axis of the light conduit does not exceed a critical angle. Thus, light entering a light conduit at an angle less than the critical angle is totally internally reflected.

The critical angle is defined as the arc sine of the ratio of the index of refraction of the surrounding medium (typically air) to that of the wall material. For example, for a transparent material of polymethylmethacrylate having a refractive index of 1.493, all incident light rays less than the critical angle of about 27.3 degrees, as measured along the longitudinal axis of the light conduit, will be totally internally reflected. On the other hand, incident light that enters light conduit outside the critical angle will not be totally internally reflected.

Alternatively, a light conduit can be constructed using a multi-layer optical film, such as disclosed in U.S. Pat. No. 5,661,839 (Whitehead). Light conduits have been constructed with various cross-sections, such as square cross-sections, as illustrated in U.S. Pat. No. 4,260,220, and circular cross-sections, as illustrated in U.S. Pat. No. 4,805,984.

In many applications, it is desirable to make light escape from the light conduit in a controllable manner. Many means for facilitating emission of light from the light conduit have been used in the past, such as disclosed in U.S. Pat. No. 5,363,470 (Wortman). In another example, an extractor such as a diffuse scatterer made from a highly reflective white polymeric tape such as SCOTCHCAL ELECTROCUT brand film, manufactured by Minnesota Mining and Manufacturing Company, St. Paul, Minn., may be placed inside a light conduit to increase the rate of leakage, or emission, of the light from inside the light conduit. The diffuse scatterer increases the rate of leakage by "scattering" light that hits it into non-total internal reflecting angular regions of the light conduit, thereby increasing the amount of light in those angles which allow light to be emitted from the light conduit. Typically, a strip of the highly reflective white polymeric tape is placed over the length of the light conduit to cause the scattering.

Current light distribution systems utilize a plurality of segmented light conduits attached to a light source, such as the LPS 1010 Light Pipe System available from Minnesota Mining and Manufacturing Company of St. Paul, Minn. Other components, such as end caps or junctions may also be connected to the segmented light conduits. The segmented light conduits can be joined to each other or to other components by a variety of techniques. U.S. Pat. Nos. 5,475,785 and 5,483,119 (Johanson) disclose overlapping the ends of adjacent light conduits to form a connector. Adhesive tapes can also be used to augment the connection. U.S. Pat. No. 4,805,984 (Cobb, Jr.) discloses light conduits that are telescopically tapered so that one conduit may be inserted into another. Alternatively, a sleeve of the same material may be placed over the abutting ends of two light conduits.

Most of the light weight materials typically used to construct light conduits have a relatively low hoop strength. Hoop strength refers to the ability of an object to retain its shape in opposition to an external force. Consequently, relatively small forces placed on the light conduit, particularly near a joint with an adjacent light conduit, can cause buckding that may separate the joint, allowing contaminants to enter the light distribution system or otherwise disrupting the light path. Misalignment during installation and thermal expansion/contraction after installation can also create stress in the light distribution system that may cause joints to separate. Moreover, depending upon how the light conduits are mounted, differential sagging of adjacent conduits can cause the joint to separate. Misalignment of adjoining segments can lead to reduced light transmission and contaminants entering the light conduit. The high static charge on some light conduits attracts dust that can migrate through extremely small openings between adjacent light conduits.

Optimum operation of a light distribution system depends on a variety of factors, such as accurate alignment of adjacent light conduits and preventing environmental contaminants, such as dust, moisture or insects, from entering the light conduits. Some prior methods of joining light conduits failed to provide the necessary structural support to maintain accurate alignment, especially in sections in excess of 20 meters in length. Additionally, maintaining rotational alignment is articularly important for light conduits that are designed to leak light along selected surfaces. Therefore, what is needed is a coupling system for light conduits that maintains both structural integrity and excludes environmental contaminants.

BRIEF SUMMARY OF THE INVENTION

The present invention relates to a coupling system for light conduits in a light distribution system. The present invention is also directed to a light distribution system utilizing the present coupling system. As used herein, "light conduit" or "light pipe" both refer to a hollow structure for transmitting or conducting light.

In one embodiment, the coupling system includes first and second collars. The first collar has a first opening, a first side adapted to couple to an end of the first light conduit, and a second side adapted to operatively engage with a second collar. The second collar has a second opening, a first side adapted to couple to an end of the second light conduit, and a second side adapted to operatively engage with the second side of the first collar. Registration members maintain rotational and axial alignment of the first and second openings of the first and second collars at a conduit interface. At least one retaining mechanism maintains axial engagement of the first collar with the second collar.

In one embodiment, the retaining mechanism comprises a clamp. The retaining mechanism may extend peripherally along substantially the entire conduit interface. The registration members resist shear forces at the conduit interface. In one embodiment, the registration members comprise pairs of complementary protrusions and slots located on the second sides of the first and second collars. The registration members may be integrally formed with the first and second collars. In another embodiment, the registration members are curved to define a circle generally concentric with the first and second openings.

The first side of the first collar comprises a plurality of alignment surfaces for aligning the first light conduit with the first opening. In one embodiment, a plurality of recesses are positioned between the alignment surfaces for receiving an adhesive.

The coupling system preferably includes a seal extending around the opening along the second side of at least one of the collars. The first and second openings are typically circular. In one embodiment, the first and second collars are identical and each has a seal.

The present invention is also directed to a light conduit system for transporting light. A first light conduit is attached to a first collar. A second light conduit is attached to a second collar adapted to operatively engage with the first collar. Registration members maintain rotational alignment of the first and second collars at a conduit interface. The retaining mechanism maintains axial engagement of the first collar with the second collar at the conduit interface. In one embodiment, the collars are adhesively bonded to the light conduits. Alternatively, the collars can be integrally formed with the light conduit.

BRIEF DESCRIPTION SEVERAL VIEWS OF THE DRAWING

DETAILED DESCRIPTION OF THE INVENTION

Figure 1:
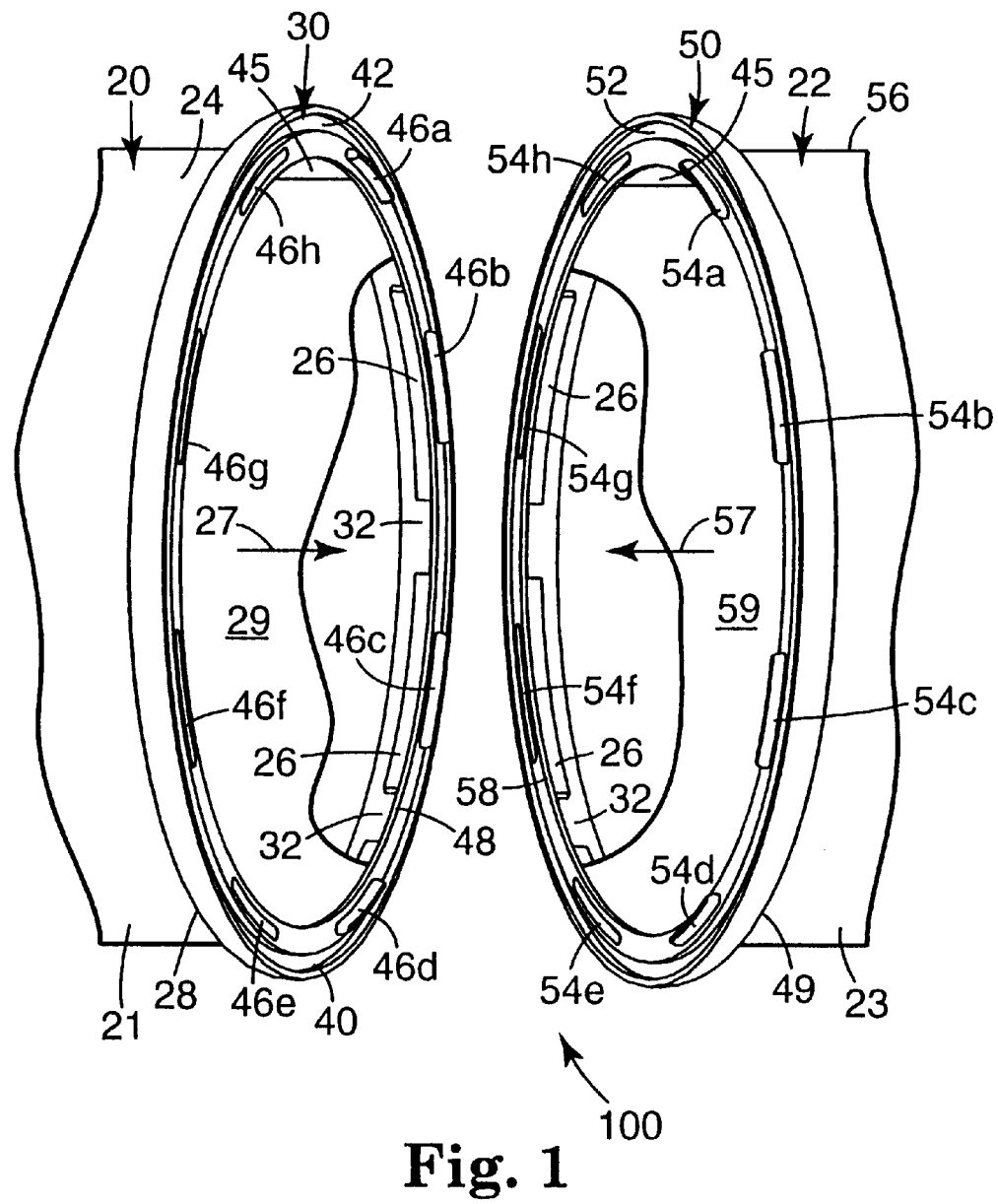
FIG. 1 is a perspective view of a coupling system for light conduits in accordance with the present invention.

FIG. 1 is a perspective view of a pair of light conduits 20, 22 forming part of a light distribution system 100. Other possible components for a light distribution system are disclosed in commonly assigned U.S. Patent applications entitled Mounting Assembly for a Light Conduit Lighting System (Attorney Docket No. 54152USA9A); Thermally Protective Coupling for a Light Conduit (Attorney Docket No. 54153USA7A), and Lighting Fixture (Attorney Docket No. 54151USA1A), all filed on the same date herewith. Light conduit 20 includes an outer wall 24 that is engaged with a plurality of alignment surfaces 26 along a first side 28 of a collar 30. The alignment surfaces 26 maintain concentric alignment of the outer wall 24 with an opening 29 in the collar 30. The alignment surfaces 26 are preferably intermittently spaced around a perimeter of the first side 28. Recesses 32 are located between the alignment surfaces 26 for receiving an adhesive to bind the outer wall 24 to the collar 30. Alternatively, the alignment surfaces 26 could be a continuous surface. Annular member 48 provide a positive stop for the outer wall 24.

Figure 5:
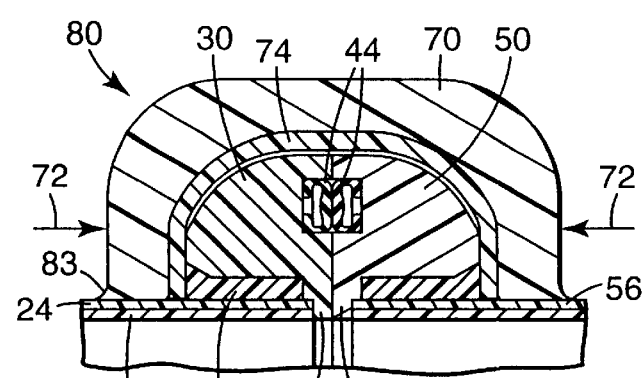
FIG. 5 is a side sectional view of a coupling system in accordance with the present invention.

Second side 40 of the collar 30 includes a gasket slot 42 for receiving a gasket 44 (see FIG. 5). The gasket 44 is preferably bonded or otherwise retained in the slot 42. The gasket 44 may be constructed from a variety of materials, such as silicone, silicone-type materials or butyl rubber. A plurality of registration members 46a, 46b, 46c, 46d, 46e, 46f, 46g, 46h are provided for engagement with collar 50. The registration members 46a, 46b, 46c, 46d comprise protrusions and the registration members 46e, 46f, 46g, 46h comprise slots. In the illustrated embodiment, the registration members 46 are slightly curved to follow the contour of the collar 30. In an alternate embodiment, the protrusions 46a, 46b, 46c, 46d alternate with the slots 46e, 46f, 46g, 46h.

Light conduit 22 includes an outer wall 56 that is engaged with a plurality of alignment surfaces 26 along a first side 49 of a collar 50. Alignment surfaces 26 position the light conduit 22 concentrically with the opening 59. The collar 50 includes a gasket slot 52 positioned so that the gasket 44 (see FIG. 5) in the slots 42 and 52 engage with one another. Annular member 58 provide a positive stop for the outer wall 56. The collar 50 includes registration protrusions 54a, 54b, 54c, 54d positioned to engage with the registration slots 46e, 46f, 46g, 46h. Registration slots 54e, 54f, 54g, 54h are positioned to engage with registration protrusions 46a, 46b, 46c, 46d. In the illustrated embodiment, the collars 30, 50 are identical, so as to be interchangeable and adapted for interengagement.

In one embodiment, the light conduits 20, 22 include apertures 21, 23, respectively, for selectively leaking light, such as disclosed in U.S. Pat. Nos. 5,661,839 (Whitehead) and 5,339,382 (Whitehead). The registration members 46, 54 on the respective collars 30, 50 maintain the rotational alignment of the light conduits 20, 22, and hence, the alignment of the apertures 21, 23 and extractor 45, if applicable.

A smooth transition between the openings 29, 59 is required for optimum light transmission. The registration members 46, 54 axially align central axes 27, 57 of the light conduits 20, 22, respectively, to be co-linear. The registration members 46, 54 also resist shear forces (see FIG. 7).

The collars 30, 50 may be constructed from a variety of materials, including without limit metals such as aluminum, or polymeric materials such as acrylonitrile butadiene styrene resin (ABS), polyethylene, butyl rubber, and polycarbonate. Transparent materials are preferred for some applications. For some embodiments, it is desirable to use the same material for the collars 30, 50 as the outer walls 24, 56 to match rates of thermal expansion. The registration members 46, 54 are preferably integrally formed with the collars 30, 50, respectively. The collars 30, 50 are preferably rigid so as to increase the hoop strength and to reduce sagging of the light conduits 20, 22 after installation. In an alternate embodiment, the collars 30, 50 are constructed from an elastomeric material. Although the collars 30, 50 and openings 29, 59 are circular in the illustrated embodiments, light conduits with various non-circular cross sections can be used, such as illustrated in U.S. Pat. Nos. 4,787,708 (Whitehead); 4,615,579 (Whitehead); 4,750,798 (Whitehead); 4,834,495 (Whitehead et al.); 5,309,544 (Saxe); 5,481,637 (Whitehead); and 5,715,347 (Whitehead).

Figure 2:
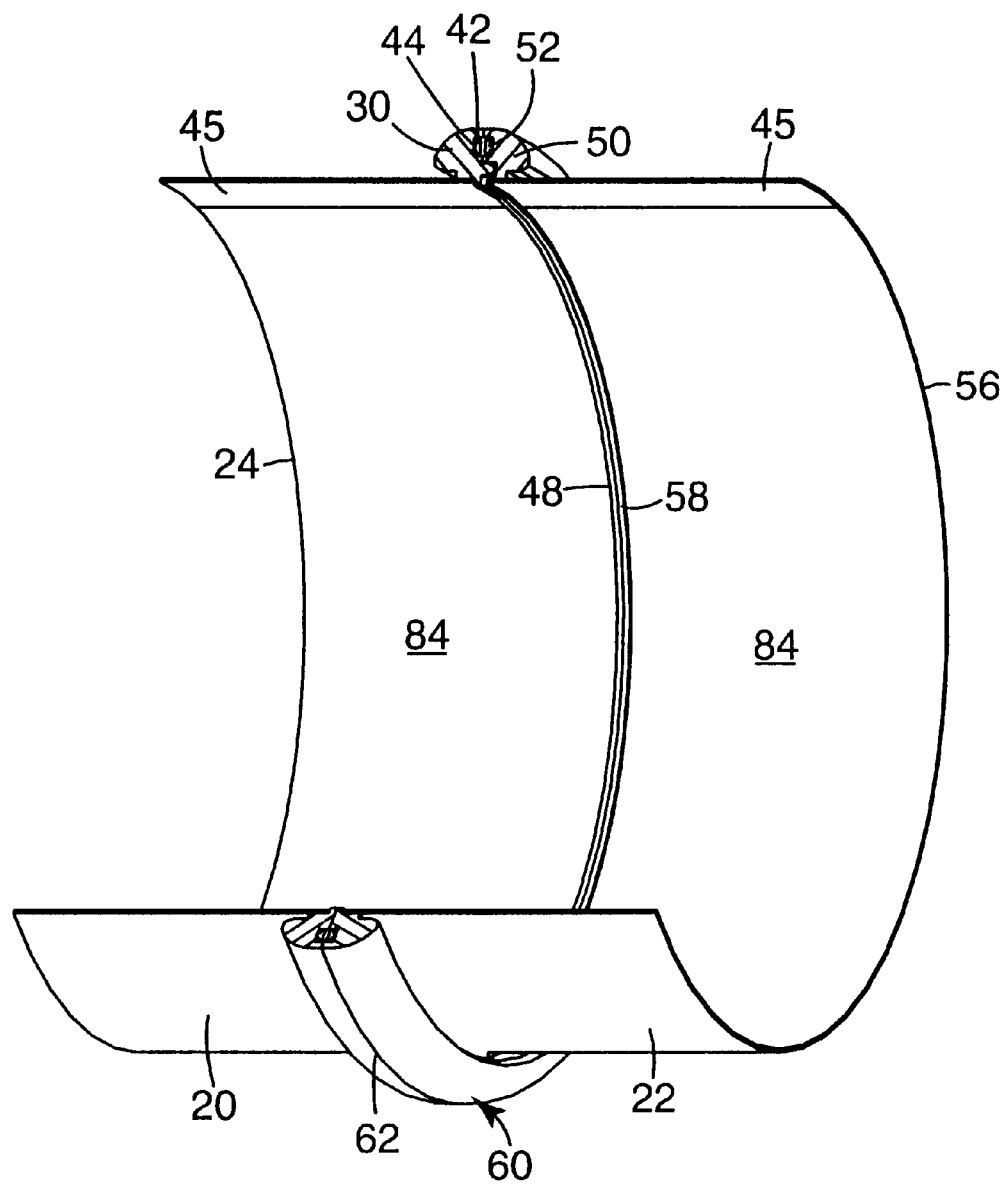
FIG. 2 is a perspective view of the coupling system of FIG. 1.

FIG. 2 is a perspective view of a conduit interface 60 of the light conduits 20, 22 illustrated in FIG. 1. The collars 30, 50 form a collar interface 62 in which the gasket slots 42, 52 are aligned. One or more gaskets 44 can be located in the gasket slots 42, 52. The registration members 46, 54 (see FIG. 1) maintain rotational alignment and resist shear forces at the conduit interface 60. Optical light film 84 is either located against an inside surface of the outer walls 24, 56 or formed integrally therewith. In one embodiment, the extractor 45 is tapered down or narrowed as it approaches the light source (not shown) so that light leakage from the conduits 20, 22 is generally uniform. In an embodiment where a separate optical light film 84 is used, the outer walls 24, 56 are formed from a clear polymeric materials, such as polycarbonate.

The optical light film 84 is generally flexible and transparent, such as for example polymeric materials or glass. Useful polymeric materials for this purpose are commercially available grades of for example, acrylics or polycarbonates having a nominal indices of refraction of about 1.49 and 1.58, respectively. Other useful polymers are polypropylenes, polyurethanes, polystyrenes, polyvinyl chlorides, and the like. The acrylics and polycarbonates are of particular interest because of their high indices of refraction and physical properties, i.e., weatherability, ultraviolet resistance, dimensional stability, and temperature tolerance. Commercially available optical light films are available from Minnesota Mining and Manufacturing Company of St. Paul, Minn. under the product designation Optical Light Film. Other optical films are disclosed in U.S. Pat. Nos. 4,906,070 (Cobb, Jr.); 5,056,892 (Cobb, Jr.); and 5,661,839 (Whitehead).

Figure 3:
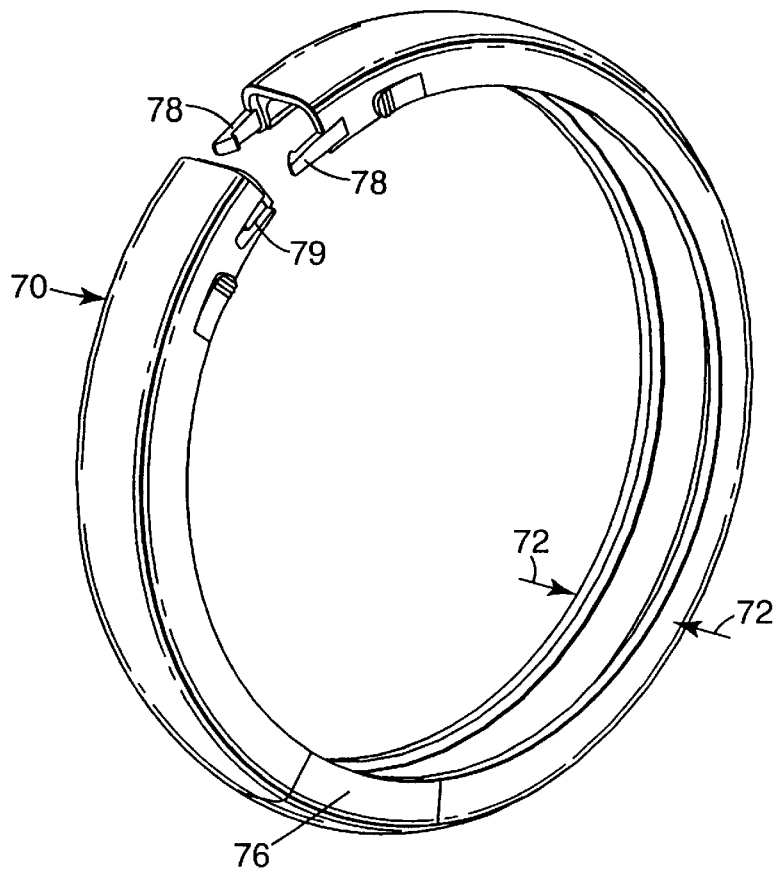
FIG. 3 is a perspective view of a retaining mechanism for a coupling system in accordance with the present invention.
Figure 7:
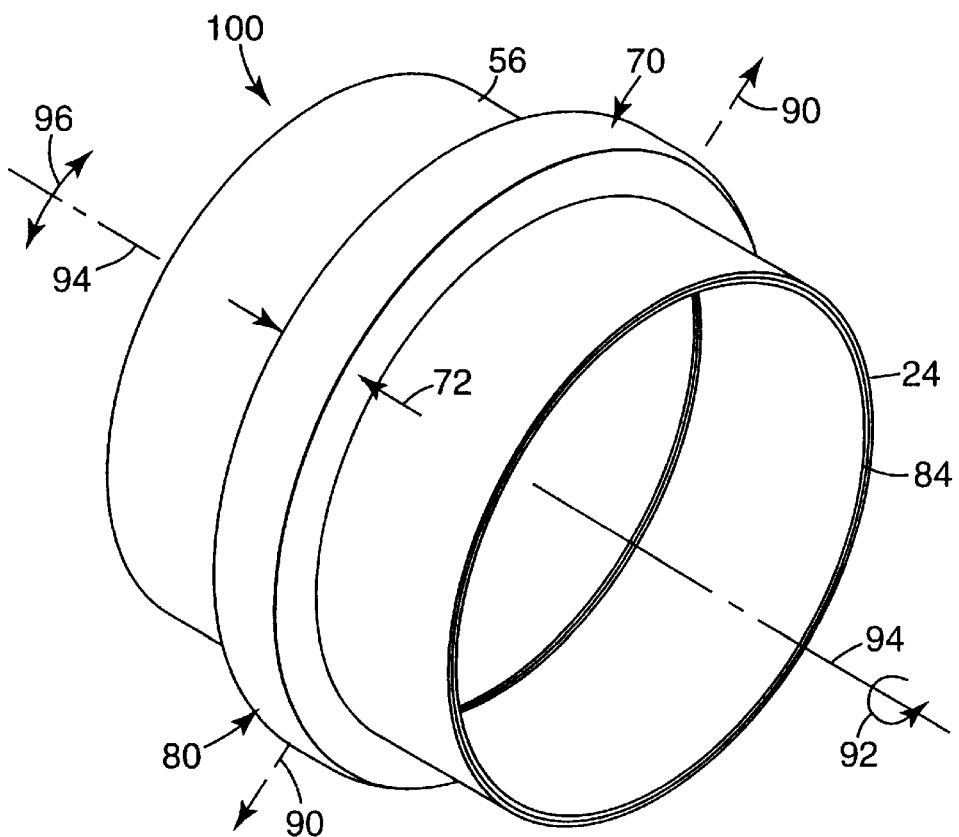
FIG. 7 is a perspective view of a conduit interface of a light distribution system in accordance with the present invention.

FIG. 3 is a perspective view of a retaining mechanism 70 for retaining the interengaged collars 30, 50 in the conduit interface 60 (see FIG. 7). In the illustrated embodiment, the retaining mechanism 70 is configured as a clamp that extends around the entire perimeter of the collars 30, 50, forming a secondary seal against contaminants. The retaining mechanism 70 can be constructed from a variety of polymeric materials, such as butyl rubber, silicone, polyethylene, or polypropylene. In one embodiment, a portion of the retaining mechanism 70 includes an integrally molded hinge portion 76 constructed from an elastomeric material. Protrusions 78 and slots 79 are provided for retaining the collar 70 at the conduit interface 60.

Figure 4:
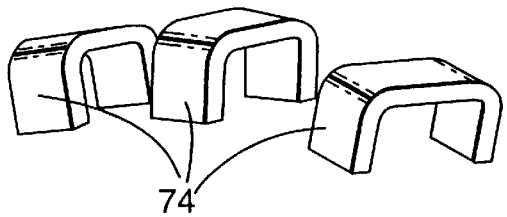
FIG. 4 is a perspective view of a plurality of reinforcing members for a retaining mechanism in accordance with the present invention.

The retaining mechanism 70 typically provides a compressive force 72 on the collars 30, 50. Reinforcing members 74, such as illustrated in FIG. 4, can optionally be molded into the retaining mechanism 70 to assist in maintaining the compressive force 72. The hinge portion 76 preferably does not include the reinforcing members 74. The reinforcing members 74 can be constructed from a variety of materials, such as metal or polymeric materials. In an alternate embodiment, the reinforcing members 74 can be attached directly to the collars 30, 50 at the conduit interface 60, without the retaining mechanism 70.

Axial engagement of the collars 30, 50 can be maintained by a variety of other mechanical fasteners, such as rivets, screws, ultrasonic or solvent welding of the collars 30, 50, and the like. Alternatively, the registration members 46, 54 may include a bayonet connector or other locking tabs that easily engages, but resists disengagement.

Figure 6:
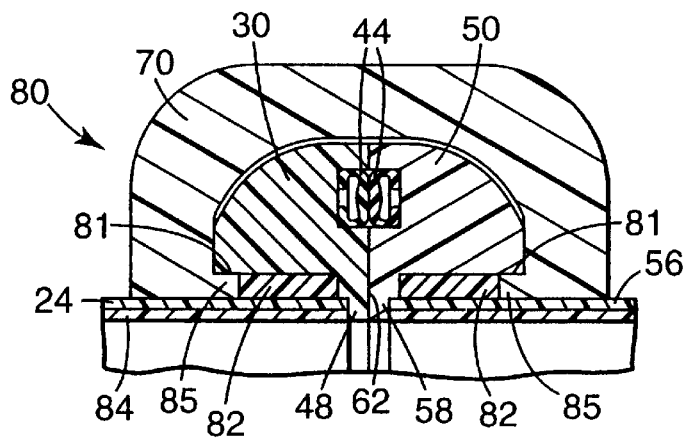
FIG. 6 is a side sectional view of an alternate coupling system in accordance with the present invention.

FIGS. 5 and 6 are sectional views of the coupling system 80 in accordance with the present invention. Collars 30, 50 are bonded to the outer walls 24, 56 by an adhesive 82 that flows into the recesses 32 between the alignment surfaces 26 (see FIG. 1). Suitable adhesives include pressure sensitive adhesives, hot melt adhesives, thermal setting or thermoplastic adhesives, radiation cured adhesives, adhesives activated by solvents, and blends thereof Jet-weld™ thermoset adhesive available from Minnesota Mining and Manufacturing Company of St. Paul, Minn. under the product designations TE-030 and TS-230 are suitable for this purpose.

Annular members 48, 58 provide a positive stop for positioning the outer walls 24, 56 in the collars 30, 50, respectively. In the embodiment illustrated in FIG. 5, reinforcing members 74 are molded into the retaining mechanism 70 to maintain the axial force 72 on the collars 30, 50 to compress the seals 44. The collar may optionally include a flange 83, preferably constructed from an elastomeric material such as silicone, that compensates for variations in the diameter of the light pipes 20, 22.

FIG. 6 is a sectional view of the coupling system 80 without the reinforcing members. Although two seals 44 are illustrated, a single seal may be used. The collars 30, 50 have an undercut 81 for engagement with a corresponding tab 85 on the retaining mechanism 70.

FIG. 7 is a perspective view of the present coupling system 80 joining light conduits 20, 22 in a light distribution system 100. The present coupling system 80 may be used for joining a light conduit to a variety of other components in the light distribution system 100, such as an end cap, a light source or a junction (not shown). As discussed above, the registration members 46, 54 resist shear forces 90 and maintain rotational alignment 92 relative to a center axis 94. The retaining mechanism 70 also provides an axial force 72 that resists a bending moment 96 along the central axis 94. The rigidity of the coupling system 80 compensates for some misalignment that occurs during mounting of the light conduits 20, 22. The combination of the gaskets 44 and retaining mechanism 70 provide a tight seal that will resist moisture, dust, insects and other contaminants that can degrade the performance of the optical light film.

All patent and patent applications, including those disclosed in the background of the invention, are hereby incorporated by reference. The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

What is claimed is:

1. A coupling system for connecting a first light conduit to a second light conduit, the coupling system comprising:
   a first collar having a first opening, a first side adapted to couple to an end of the first light conduit, and a second side adapted to operatively engage with a second collar;
   a second collar having a second opening, a first side adapted to couple to an end of the second light conduit, and a second side adapted to operatively engage with the second side of the first collar;

registration members for rotationally and axially aligning the first and second openings of the first and second collars at a conduit interface; and at least one retaining mechanism for maintaining axial engagement of the first collar with the second collar.

2. The system of claim 1 wherein the retaining mechanism comprises a clamp.

3. The system of claim 1 wherein the retaining mechanism extends peripherally along substantially the entire conduit interface.

4. The system of claim 1 wherein the retaining mechanism further comprises a flange adapted to engage with the first and second light conduits adjacent to the conduit interface.

5. The system of claim 1 wherein the registration members resist shear forces at the conduit interface.

6. The system of claim 1 wherein the registration members comprise pairs of complementary protrusions and slots located on the second sides of the first and second collars.

7. The system of claim 1 wherein the registration members are integrally formed with the first and second collars.

8. The system of claim 1 wherein the registration members are curved to define a circle generally concentric with the first and second openings.

9. The system of claim 1 wherein the first side of the first collar comprises a plurality of alignment surfaces for aligning the first light conduit with the first opening.

10. The system of claim 9 further comprising a plurality of recesses between the alignment surfaces.

11. The system of claim 1 further comprising a seal extending around the opening along the second side of at least one of the collars.

12. The system of claim 1 wherein the first and second openings are circular.

13. The system of claim 1 wherein the first and second collars are identical.

14. A light conduit system for transporting light comprising:

a first light conduit defining a first conduit opening;

a first collar having a first side attached to a first end of the first light conduit, the first collar defining a first collar opening corresponding to the first conduit opening of the first light conduit, and a second side adapted to operatively engage with a second collar;

a second light conduit defining a second conduit opening;

a second collar having a first side attached to a first end of the second light conduit, the second collar defining a second collar opening corresponding to the second conduit opening of the second light conduit, and a second side adapted to operatively engage with the second side of the first collar;

registration members for rotationally and axially aligning the first and second openings of the first and second collars at a conduit interface; and at least one retaining mechanism for maintaining axial engagement of the first collar with the second collar.

15. The system of claim 14 wherein the first side of the first collar is adhesively bonded to the first light conduit.

16. The system of claim 14 wherein the first collar is integrally formed with the first light conduit.

17. The system of claim 14 further comprising at least one seal interposed between the first and second collars at the conduit interface.

18. The system of claim 14 wherein the retaining mechanism comprises a clamp.

19. The system of claim 14 wherein the retaining mechanism extends peripherally along substantially the entire conduit interface.

20. The system of claim 14 wherein the registration members resist shear forces at the conduit interface.

21. The system of claim 14 wherein the registration members comprise pairs of complementary protrusions and slots located on the second sides of the first and second collars.

22. The system of claim 14 wherein the registration members are integrally formed with the collars.

23. The system of claim 14 wherein the registration members are curved to define a circle generally concentric with the first and second openings.

24. The system of claim 14 wherein the first side of the first collar comprises a plurality of alignment surfaces for aligning the first light conduit with the first opening.

25. The system of claim 14 wherein the first and second collar openings are circular.

26. The system of claim 14 wherein the first and second collars are identical.

27. The system of claim 14 wherein the first light conduit comprises a wall member of a transparent material defining an opening, the wall member including a structured surface on one side and a smooth surface opposite the structured surface on the other side, the structured surface having a linear array of substantially right angled isosceles prisms arranged side-by-side, the perpendicular side of the prisms making an angle of approximately 45 degrees with a tangent to the smooth surface.

* * * * *